United States Patent [19]

Pedicini et al.

[11] Patent Number: 5,639,568

[45] Date of Patent: Jun. 17, 1997

[54] SPLIT ANODE FOR A DUAL AIR ELECTRODE CELL

[75] Inventors: Christopher S. Pedicini, Marietta, Ga.; William Charles Thibault, Melrose, Fla.; Chris Anthony Turner, Chamblee; Lawrence Andrew Tinker, Woodstock, both of Ga.

[73] Assignee: AER Energy Resources, Inc., Atlanta, Ga.

[21] Appl. No.: 543,558

[22] Filed: Oct. 16, 1995

[51] Int. Cl.[6] .................... H01M 4/24; H01M 12/08
[52] U.S. Cl. .................... 429/27; 429/53; 429/246
[58] Field of Search .................... 429/27, 53, 82, 429/246

[56] References Cited

U.S. PATENT DOCUMENTS

| | | | |
|---|---|---|---|
| 3,072,284 | 1/1963 | Luhman | 220/44 |
| 3,436,270 | 4/1969 | Oswin et al. | 136/120 |
| 3,532,548 | 10/1970 | Stachurski | 136/164 |
| 3,598,655 | 8/1971 | Hamlen et al. | 136/162 |
| 3,600,233 | 8/1971 | Coffey et al. | 136/166 |
| 3,615,860 | 10/1971 | Terlecke | 136/107 |
| 3,647,542 | 3/1972 | Berger | 136/6 |
| 3,718,507 | 2/1973 | Linden | 136/86 |
| 3,744,516 | 7/1973 | Rowe | 137/587 |
| 3,871,920 | 3/1975 | Grebier et al. | 136/86 |
| 3,909,302 | 9/1975 | Mermelstein | 136/177 |
| 3,975,210 | 8/1976 | Warnock | 136/86 |
| 3,976,502 | 8/1976 | Sekido et al. | 136/6 |
| 3,977,901 | 8/1976 | Buzzelli | 136/86 |
| 4,112,199 | 9/1978 | Dunlop et al. | 429/29 |
| 4,118,544 | 10/1978 | Przybyla et al. | 429/27 |
| 4,152,489 | 5/1979 | Chottiner | 429/27 |
| 4,215,186 | 7/1980 | Jaeger | 429/139 |
| 4,292,357 | 9/1981 | Erisman et al. | 429/246 X |
| 4,298,666 | 11/1981 | Taskier | 429/206 |
| 4,354,958 | 10/1982 | Solomon | 429/42 X |
| 4,359,510 | 11/1982 | Taskier | 429/144 |
| 4,400,447 | 8/1983 | Gerenser et al. | 429/27 |
| 4,444,852 | 4/1984 | Liu et al. | 429/29 |
| 4,484,691 | 11/1984 | Lees | 220/89 |
| 4,518,705 | 5/1985 | Solomon et al. | 502/101 |
| 4,529,670 | 7/1985 | Findl | 429/38 |
| 4,560,626 | 12/1985 | Joy | 429/27 |
| 4,615,954 | 10/1986 | Solomon et al. | 429/27 |
| 4,626,482 | 12/1986 | Hamlen et al. | 429/27 |
| 4,745,038 | 5/1988 | Brown | 429/27 |
| 4,927,514 | 5/1990 | Solomon et al. | 204/290 R |
| 4,950,561 | 8/1990 | Niksa et al. | 429/27 |
| 4,957,826 | 9/1990 | Cheiky | 429/27 |
| 4,965,147 | 10/1990 | Mas et al. | 429/136 |
| 5,024,904 | 6/1991 | Curiel | 429/27 |
| 5,084,364 | 1/1992 | Quaadvliet | 429/34 |
| 5,091,272 | 2/1992 | Treger | 429/62 |
| 5,196,275 | 3/1993 | Goldman et al. | 429/27 |
| 5,225,292 | 7/1993 | Korinek et al. | 429/246 X |
| 5,260,144 | 11/1993 | O'Callahan | 429/14 |
| 5,306,679 | 4/1994 | Shepard, Jr. et al. | 429/40 |
| 5,318,861 | 6/1994 | Harats et al. | 429/21 |

(List continued on next page.)

*Primary Examiner*—Stephen Kalafut
*Attorney, Agent, or Firm*—Jones & Askew, LLP

[57] ABSTRACT

A dual air electrode metal-air cell having a casing with an upper cathode mask wall, a lower cathode mask wall, and a side wall; an anode assembly having a layer of anode material positioned above and below an anode collector and means, that may be a membrane or a solid foil current collector, for inhibiting movement of anode material between the two layers; separator materials covering the anode assembly on at least its upper and lower sides; an upper air cathode positioned between the upper cathode mask wall and the separator materials on the upper side of the anode assembly; a lower air cathode positioned between the lower cathode mask wall and the separator materials on the lower side of the anode assembly; a gas vent positioned on one or more of the side walls of the casing; and a liquid electrolyte substantially trapped by the separator materials. The separator materials comprise one or more layers of an absorbent fibrous web and one or more layers of a microporous membrane that, when wet, is gas-impermeable and liquid-permeable.

35 Claims, 8 Drawing Sheets

U.S. PATENT DOCUMENTS

| | | | |
|---|---|---|---|
| 5,328,777 | 7/1994 | Bentz et al. | 429/27 |
| 5,328,778 | 7/1994 | Woodruff et al. | 429/27 |
| 5,342,708 | 8/1994 | Green et al. | 429/145 |
| 5,354,625 | 10/1994 | Bentz et al. | 429/17 |
| 5,362,577 | 11/1994 | Pedicini | 429/27 |
| 5,366,822 | 11/1994 | Korall et al. | 429/27 |
| 5,387,477 | 2/1995 | Cheiky | 429/26 |
| 5,389,433 | 2/1995 | Chang et al. | 428/310.5 |
| 5,431,823 | 7/1995 | Gofer | 210/636 |
| 5,462,816 | 10/1995 | Okamura et al. | 429/27 X |
| 5,532,086 | 7/1996 | Thibault et al. | 429/245 |
| 5,569,551 | 10/1996 | Pedicini et al. | 429/27 |

SPLIT ANODE FOR A DUAL AIR ELECTRODE CELL

TECHNICAL FIELD

This invention relates to electrochemical cells, and more particularly to a dual air electrode metal-air cell with a split anode for the prevention of slumping.

BACKGROUND OF THE INVENTION

Metal-air cells have been recognized as a desirable means by which to power portable electronic equipment such as personal computers. A power supply with metal-air cells would be preferred by consumers because such cells have a relatively high power output with relatively low weight as compared to other types of electrochemical cells. Metal-air cells utilize oxygen from the ambient air as a reactant in the electrochemical process rather than a heavier material such as a metal or metallic composition.

Metal-air cells use one or more air permeable cathodes separated from a metallic anode by an aqueous electrolyte. During the operation of the cell, such as a zinc-air cell, oxygen from the ambient air is converted at the cathode to hydroxide ions, zinc is oxidized at the anode and reacts with the hydroxide ions, such that water and electrons are released to provide electrical energy.

Recently, metal-air recharging technology has advanced to the point that metal-air cells are rechargeable and are useful for multiple discharge cycles. An electronically rechargeable metal-air cell is recharged by applying voltage between the anode and the cathode of the cell and reversing the electrochemical reaction. Oxygen is discharged back to the atmosphere through the air-permeable cathode and hydrogen is vented out of the cell.

Metal-air cells may be arranged in multiple cell battery packs to provide a sufficient amount of power output for devices such as computers. An example of a metal-air power supply is found in commonly owned U.S. Pat. No. 5,354,625 to Bentz, et al., entitled "Metal-Air Power Supply And Air Manager System, And Metal-Air Cell For Use Therein," the disclosure of which is incorporated herein by reference.

Attempts to increase even further the power output of metal-air cells have had mixed results. Increasing the power output of a cell usually involves operating the cell at a higher current drain. Such a higher load, however, can significantly decrease the total energy density of the system and greatly increase the production of heat, both of which are detrimental to efficiency and lifetime of the cell.

It has been suggested that the energy density and heat problems can be overcome in an increased power cell by placing an air cathode on either side of the anode, i.e., a dual air electrode cell. (The present invention is properly described as a "dual air electrode" cell, rather than a "dual cathode" cell, because the function of the cathodes and the anode is reversed during the recharging process.) Such a dual air electrode design would increase the available surface area of the cathode material and should reduce the impedance of the system as a whole.

Known dual air electrode designs, however, suffer from several deficiencies such as how to vent the cell without causing excessive self-discharge and even how to fill the cell efficiently with electrolyte. Other problems that have been encountered include limited capacity retention, electrolyte leakage, and excessive water vapor loss.

Another problem in known designs is "slumping" of the anode, or the escape of zinc, once it is discharged to zinc oxide, from the top side of the anode to the bottom side. Slumping contributes to capacity loss, operating voltage loss, and may cause an imbalance in current distribution between the cathodes. Although known designs have attempted to localize the problem of slumping by using a honey-comb shaped anode, these designs do not eliminate the flow of zinc oxide.

Accordingly, there is a need for an increased power output from a metal-air power supply without compromising the efficiency and lifetime of the cell. Associated with this goal of efficiency and long life is the elimination of slumping in the anode. These goals must be accomplished in a cell that remains light-weight and relatively inexpensive for widespread consumer use in any type of portable electronic device.

SUMMARY OF THE INVENTION

Generally described, the present invention provides a dual air electrode metal-air cell having a casing with an upper cathode mask wall, a lower cathode mask wall, and a side wall; an anode assembly having a layer of anode material positioned above and below an anode collector and means, that may be a membrane or a solid foil current collector, for inhibiting movement of anode material between the two layers; separator materials covering the anode assembly on at least its upper and lower sides; an upper air cathode positioned between the upper cathode mask wall and the separator materials on the upper side of the anode assembly; a lower air cathode positioned between the lower cathode mask wall and the separator materials on the lower side of the anode assembly; a gas vent positioned on one or more of the side walls of the casing; and a liquid electrolyte substantially trapped by the separator materials. The separator materials comprise one or more layers of an absorbent fibrous web and one or more layers of a microporous membrane that, when wet, is gas-impermeable and liquid-permeable.

Specific embodiments of this invention include the use of a plastic cell casing with two mask walls each defining a plurality of conically shaped openings. Positioned within the casing is a layer of an absorbent diaper material, a first air cathode, a separator layer comprising a layer of an absorbent fibrous web and a layer of a microporous membrane that, when wet, is gas-impermeable and liquid-permeable, an anode bag comprising the anode assembly covered by a layer of an absorbent fibrous web and a layer of a microporous membrane that, when wet, is gas-impermeable and liquid-permeable, a second separator layer, a second cathode, and a second layer of an absorbent diaper material. The ends of the cell casing are enclosed with a gas vent for the dispersion of gases generated within the cell.

Such an embodiment has significant advantages over the prior art. First, the second cathode greatly increases the available cathode surface area, leading to a significantly higher power output as compared to a single cathode cell. Energy density of the cell actually increases because the increased weight of the second cathode is offset by the increased operating voltage of the cell.

Further, the use of the anode bag effectively limits self-discharge of the cell while maintaining the capacity of the cell. By wrapping the anode in a microporous membrane that is gas-impermeable and liquid-permeable, oxygen from the ambient air that has seeped into the cell must go through a solubility step before it can pass through the anode bag to contact and discharge the anode. This solubility step is a relatively slow reaction such that self discharge is greatly eliminated.

The anode bag also maintains the capacity or useful lifetime of the cell by preventing the spread of zinc oxide throughout the case. Zinc oxide generated at the anode may dissolve in the electrolyte and travel throughout the cell casing. The capacity of the cell dissipates as the zinc oxide loses electrical contact with the current collector. By wrapping the anode in the microporous membrane, the zinc oxide remains in intimate contact with the current collector because it is unable to pass through the membrane.

The microporous membrane also prevents the growth of dendrites on the metal anode that may cause a short circuit in the cell if they come in contact with the cathodes. By keeping the zinc oxide of the anode wrapped within a defined volume, dendrite cannot grow and reach the cathodes.

Similarly, the design of the anode assembly itself limits slumping of the anode. Slumping is eliminated by a split anode design having two anode layers separated by a current or anode collector. The anode collector can be either a foil layer or a two layer screen separated by an anode separator layer such as a microporous membrane. Both the use of the foil and the separator layer mechanically keep the zinc oxide in contact with the top anode layer.

The combination of the anode bag materials and the separator layer materials also provides orientation independence to the cell. Orientation independence is achieved because the electrolyte is effectively trapped in the absorbent fibrous webs adjacent to the anode and cathodes. Known cells are generally flooded with electrolyte that travels under the influence of gravity. The cell of the present invention holds or "traps" the electrolyte in place between the anode and the cathodes via the separator materials such that the cell can operate in any orientation.

These feature are combined into a novel metal-air cell with significant advantages over the art. Other features of the invention provide for efficient filling of the cell with electrolyte, limited water vapor loss with efficient air intake, and limited or eliminated cell leakage. These features are provided in a metal-air cell without compromising the efficiency and lifetime of the cell.

It is thus an object of the present invention to provide an improved metal-air cell.

It is another object of the present invention to provide a dual air electrode cell.

It is a further object of the present invention to provide an improved metal-air cell with increased power output.

It is a still further object of the present invention to provide an improved metal-air cell that limits the self-discharge of the cell.

It is a still further object of the present invention to provide an improved metal-air cell with significant capacity retention.

It is a still further object of the present invention to provide an improved metal-air cell that eliminates dendrite growth on the anode.

It is a still further object of the present invention to provide an improved metal-air cell with operational orientation independence.

It is a still further object of the present invention to provide an improved metal-air cell casing that resists leaking or wicking.

It is a still further object of the present invention to provide a cathode separator for a metal-air cell that permits the escape of gasses while filling the cell with electrolyte.

It is a still further object of the present invention to provide an air mask for an improved metal-air cell with conically shaped openings for efficient air intake and limited water vapor loss.

It is a still further object of the present invention to provide a split anode for a metal-air cell.

It is a still further object of the present invention to prevent "slumping" of the anode, or the prevention of metal oxide falling from one side of the metal anode to the other.

It is a still further object of the present invention to prevent slumping of the anode in a split anode cell by providing a separator layer.

It is a still further object of the present invention to prevent slumping of the anode in a split anode cell by providing a foil anode collector.

Other objects, features, and advantages of the present invention will become apparent upon review of the following detailed description of the preferred embodiments of the invention, when taken in conjunction with the drawings and the claims.

DETAILED DESCRIPTION OF THE INVENTION

Referring now to the drawings in which like numerals indicate like elements throughout the several views, FIGS. 1-6 show the preferred embodiment of a dual air electrode cell 10. The major elements of the dual air electrode cell 10 include a cell casing 20, one or more vent caps 30, an anode bag 40, a first or upper air cathode 50, a second or lower air cathode 60, a first or upper separator layer 70, and a second or lower separator layer 80. The cell casing 20 is filled with a volume of an aqueous electrolyte 90.

The cell casing 20 is a multi-piece structure comprising a first or upper cathode mask wall 21, a second or lower cathode mask wall 22, and a plurality of side walls 23. The casing 20 is preferably molded from a lightweight plastic such as polypropylene, although any lightweight material may be used. The respective elements of the cell casing 20 are sealed together via a hot melt process or other sealing methods. The casing 20 preferably has a width of approximately 2.68 inches, a length of approximately 4.71 inches, and a depth of approximately 0.61 inches, though the size of the cell 10 is dependent, in part, on the nature of its intended use. This embodiment of the cell 10 is intended for use in a battery pack (not shown) for consumer electronics such as personal computers.

Figure 1:
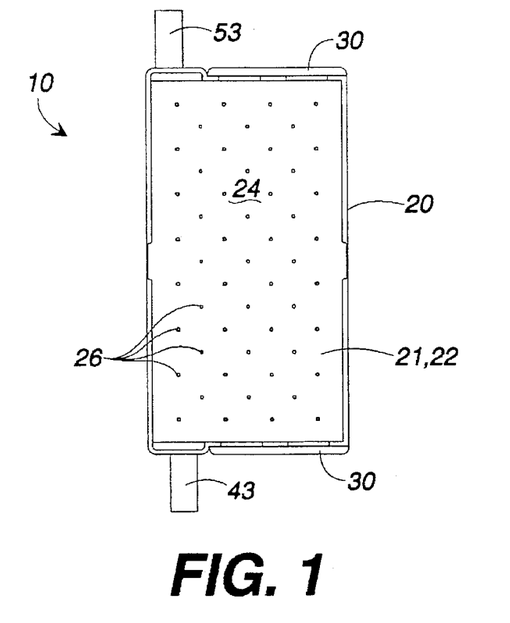
FIG. 1 is a plan view of the dual air electrode cell.
Figure 2:
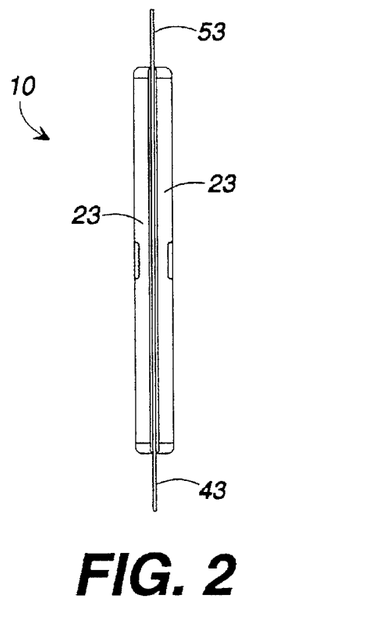
FIG. 2 is a side view of the dual air electrode cell.
Figure 3:
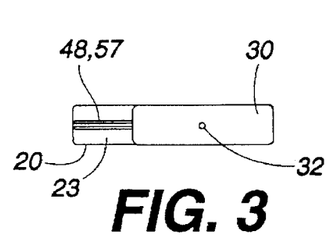
FIG. 3 is an end view of the dual air electrode cell showing the vent cap.
Figure 4:
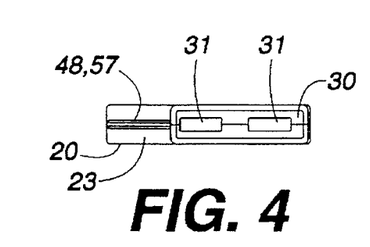
FIG. 4 is an end view of the dual air electrode cell showing side walls without the vent cap.
Figure 7:
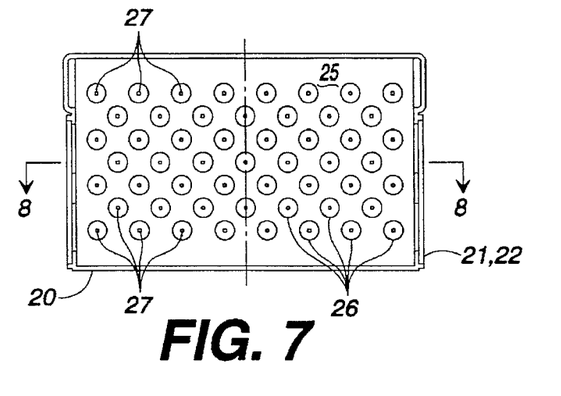
FIG. 7 is a plan view of the interior side of the cell casing.
Figure 8:
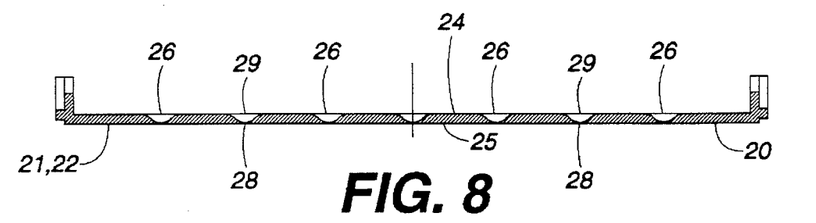
FIG. 8 is a side cross-sectional view of the cell casing taken along line 8—8 of FIG. 7.

As is shown in FIGS. 1, 7 and 8, each cathode mask wall 21, 22 has an exterior surface 24 facing the atmosphere and an opposite interior surface 25. The cathode mask walls 21, 22 define a plurality of conically shaped openings 26. In the casing 20 described above, there are preferably fifty-three openings 26, more or less evenly spaced over each cathode mask wall 21, 22. The conically shaped openings 26 each has an orifice 27 at its apex 28 on the exterior surface 24 and a base 29 on the interior surface 25 of the mask walls 21, 22.

Preferably, the orifices 27 are approximately 0.047 inches in diameter and the bases 29 are approximately 0.25 inches. Such a mask configuration leads to a total open area of the orifices 27 on the exterior surface 25 of the mask walls 21, 22 as compared to the total available surface area of the cathodes 50, 60 of approximately 0.9 percent. The acceptable range for the size of the orifices 27 to the total cathode surface area is between approximately 0.1 to 5 percent. The acceptable range of the diameter of the orifices 27 to the diameter of the bases 29 can be one-to-one or greater.

Figure 9:
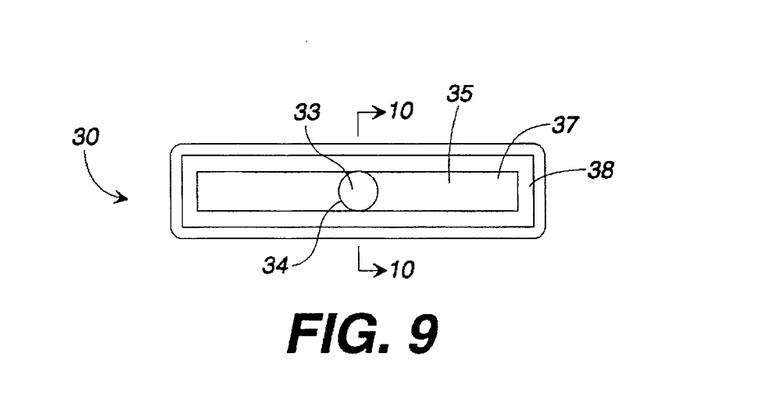
FIG. 9 is a plan view of the vent cap.
Figure 10:
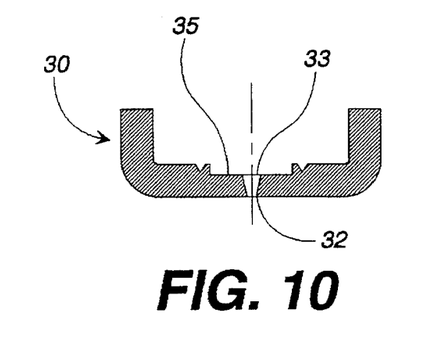
FIG. 10 is a side cross-sectional view of the vent cap taken along line 10—10 of FIG. 9.
Figure 11:
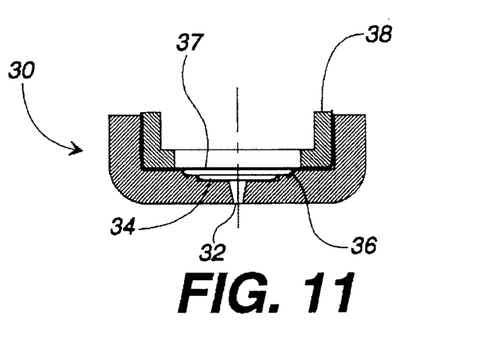
FIG. 11 is a side cross-sectional view of the vent cap taken along line 10—10 of FIG. 9 and showing the interior cap vent elements.

The side walls 23 of the casing 20 define one or more apertures 31 for venting and filling the cell 10 with electrolyte 90. These apertures 31 are covered and sealed by the vent caps 30. The vent caps 30 are shown in FIGS. 9-11. Like the casing 20, the vent caps 30 also preferably are constructed of a lightweight plastic such as polypropylene. The caps 30 are sized to cover and seal the apertures 31 and are approximately 1.93 inches in length and approximately 0.48 inches in width.

Each vent cap 30 defines one or more gas exit holes 32 in the center thereof. The gas exit hole 32 is approximately 0.02 inches in diameter and is surrounded by a small recess 33 defined in the interior of the vent cap 30. The recess 33 is generally circular in shape and approximately 0.172 inches in diameter and approximately 0.012 inches in depth. The recess 33 is filled with a secondary vent seal 34 via ultrasonic welding or other bonding means. The secondary vent 34 is preferably a hydrophobic, gas permeable membrane such as a polypropylene membrane sold under the trademark Celgard 4599.

The recess 33 is in turn surrounded by a rectangularly-shaped gas collection area 35, also defined in the vent cap 30. The gas collection area 35 is filled with a gas collection or diffusion membrane 36 of approximately 1.5 inches in length and approximately 0.182 inches in width. The gas collection membrane 36 is attached to the gas collection area 35 via an adhesive or other bonding methods. The gas collection membrane 36 is preferably a polyvinyl acetate material such as that sold under the trademark Dexter 7487 or a polyethylene material such as that sold under the trademark Porex.

The gas collection area 35 and the gas collection membrane 36 are in turn covered with a primary vent seal 37 attached to the vent cap 30 by adhesives or other bonding methods. The primary vent seal 37 is preferably a microporous Teflon film and is approximately 1.8 inches in length and approximately 0.35 inches in width. A similar vent structure with a gas collection area defined by a plurality of hydrophobic, gas permeable membranes is described in commonly owned U.S. Pat. No. 5,362,577 to Pedicini, entitled "Diffusion Vent for a Rechargeable Metal-air Cell," the description of which is incorporated herein by reference.

Finally, a vent support frame 38 is inserted into and attached to the vent cap 30 by adhesives or other bonding methods. The vent support frame 38 holds the gas collector membrane 36 and the other the vent cap elements in place. The vent support frame 38 is constructed from the same light weight plastic materials, such as polypropylene, as the casing 20 and the vent caps 30.

Figure 5:
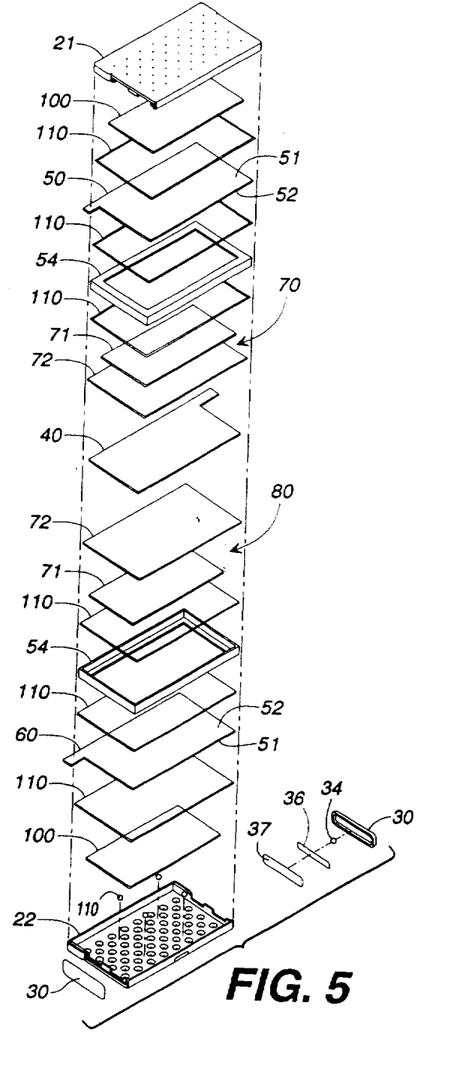
FIG. 5 is an exploded view of the elements of the dual air electrode cell.

Referring primarily to FIG. 5, unless indicated otherwise the cell 10 itself comprises a series of elements layered within the casing 20 that are assembled in sandwich style. The interior surfaces 25 of the cathode mask walls 21, 22 are covered with a layer of an absorbent diaper material 100. This absorbent diaper 100 is preferably a layer of polyacrylic acetate. The absorbent diaper 100 is attached by an adhesive 110 or other bonding methods. The absorbent diaper 100 absorbs any electrolyte 90 that may leak out of the mask walls 21, 22. The absorbent diaper 100 also assists in the lateral diffusion of ambient air that enters through the mask walls 21, 22 and travels to the cathodes 50, 60.

The first cathode 50 is then positioned against the absorbent diaper 100 on the interior surface 25 of the first cathode mask wall 21 and the second cathode 60 is positioned against the absorbent diaper 100 on the interior surface 25 of the second cathode mask wall 22. The mask walls 21, 22 are recessed to receive the diaper layer 100 and the cathodes 50, 60. The cathodes 50, 60 can be any type of porous sheet-type cathodes. Such cathodes typically include an active layer directly adhered to a gas-permeable, liquid-impermeable, wet-proofing layer. An example of such a cathode is disclosed in commonly owned U.S. Pat. No. 5,306,579 to Shepard, Jr., et al., entitled "Bifunctional Metal-Air Electrode," or as described in U.S. Pat. Nos. 4,354,958; 4,444,852; 4,518,705; 4,615,954; and 4,927,514, the disclosures of which are incorporated herein by reference. These cathodes 50, 60 include an air side 51 having a mixture of carbon black particles and a hydrophobic polymer, such as polytetrafluoroethylene or Teflon, positioned adjacent to the absorbent diaper 100, and an electrolyte side 52 including catalyzed particles of activated carbon and Teflon particles on the opposite side in contact with the electrolyte 90.

As is seen in FIGS. 1–4, each cathode 50, 60 further comprises a cathode tab 53 that extends out of the casing 20 to provide a negative terminal for the cell 10. The side walls 23 of the casing 20 have one or more recesses 57 therein to accommodate the positioning of the tabs 53.

Figure 6:
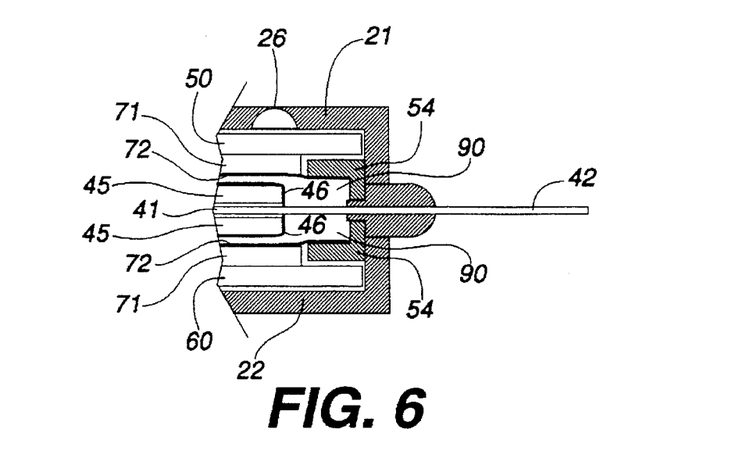
FIG. 6 is a partial side cross-sectional view of the dual air electrode cell.

The cathodes 50, 60 are held in place adjacent to the absorbent diapers 100 and the respective cathode mask walls 21, 22 by an application of adhesives 110 or other bonding methods. The cathodes 50, 60 are further held in place adjacent to the respective mask walls 21, 22 by a cathode support frame 54. As is shown in FIGS. 5 and 6, the cathode support frames 54 are positioned on the cathodes 50, 60 and into the recesses of the respective cathode mask walls 21, 22 to support the periphery of each cathode 50, 60. The support frames 54 are held in place by an application of adhesives 110 or other bonding methods. Each cathode support frame 54 is approximately 4.7 inches in length, approximately 2.67 inches in width, approximately 0.165 inches in depth, and is contoured to fit the shape of the mask walls 21, 22. The cathode support frames 54 provide structural strength to the cell 10 and insure that electrolyte 90 does not penetrate around the edges of the respective cathodes 50, 60 and leak out of the cell 10.

Figure 22:
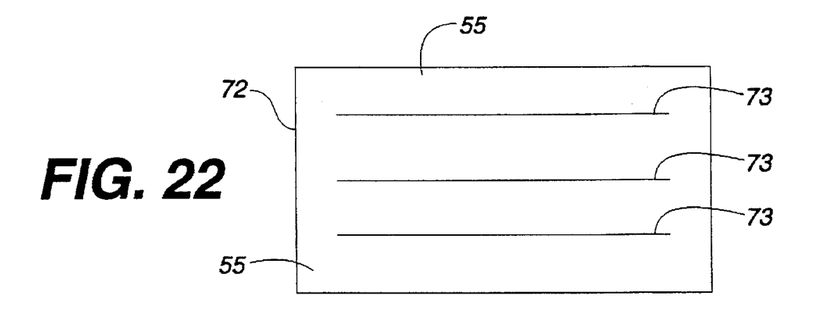
FIG. 22 is a plan view of the cathode separator membrane with slits.

The electrolyte side 52 of each cathode 50, 60 is then covered with a separator layer 70, 80. The first cathode 50 is covered with a first separator layer 70 and the second cathode 60 is covered with a second separator layer 80. Each separator layer 70, 80 comprises a layer of an absorbent fibrous web 71 and a layer of a microporous membrane 72 that, when wet, is gas-impermeable and liquid-permeable. The preferred absorbent fibrous web 71 comprises Nylon such as that sold by Hollingsworth & Vose under the designation TR1113H, while the preferred microporous membrane 72 comprises a polypropylene membrane such that sold under the trademark Celgard 5511. The microporous membrane 72 also may contain one or more slits 73 (shown in FIG. 22) in a central portion of the membrane 72. While the term "slits" is used, the opening can be of any shape such as a tab or a slot in the material. The separator layers 70, 80 are attached to the cathodes 50, 60 and the respective support frames 54 by adhesives 110 or other bonding methods.

Finally, the anode bag 40 is positioned between the first separator layer 70 and the second separator layer 80. The anode bag 40 comprises an anode assembly 120 (shown in FIG. 14 and discussed in greater detail below) wrapped in a two layer separator bag 44. The separator bag 44 comprises a layer of an absorbent fibrous web material 45, such as Nylon sold by Hollingsworth & Vose under the designation TR1113G, and a layer of a microporous membrane 46 that, when wet, is gas-impermeable and liquid-permeable, such as that sold under the trademark Celgard 5511. The separator bag 44 materials are the same as those in the first and second separator layers 70, 80 except for the fact that the absorbent fibrous web 45 of the separator bag 44 is one-half the thickness of the fibrous web 71 of the separator layers 70, 80.

As is shown in FIGS. 15–18, the anode assembly 120 is positioned on the absorbent fibrous web material 45 and the web material 45 is folded over the anode 41. The lateral edges of the web material 45 are then sealed together by adhesives 110 or other bonding methods. The anode assembly 120 and the absorbent fibrous web 45 are then positioned on the microporous membrane layer 46. Adhesives 110 are applied to the absorbent fibrous web material 45 to keep it in place and the microporous membrane 46 is folded over the anode assembly 120 and the absorbent fibrous web 45. The microporous membrane 46 slightly overlaps the anode assembly 120/absorbent fibrous web 45, such that the lateral edges of the microporous membrane 46 can be heat sealed together to form a seam 49. Any excess microporous membrane 46 material is then trimmed and discarded. One or more small bag apertures 47, such as an approximate 0.6 inch unsealed portion of the seam 49, may be left in one end of the anode bag 40 to permit the entry of electrolyte 90 to the absorbent fibrous web 45. Thus, the microporous membrane 46 forms a substantially sealed anode bag 40 enclosing the anode assembly 120 and the fibrous web 45.

Figure 12:
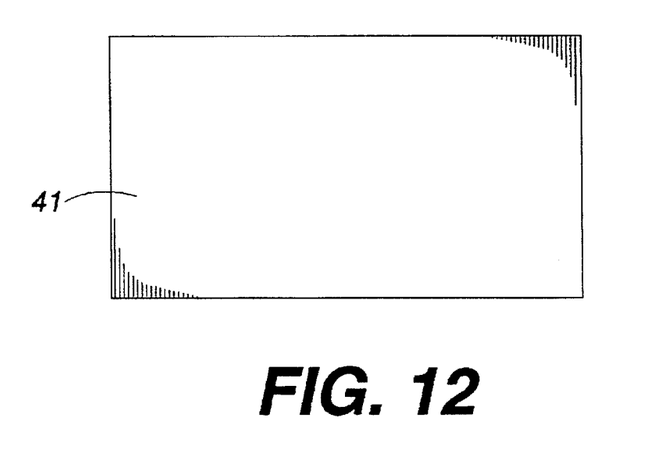
FIG. 12 is a plan view of the anode.
Figure 13:
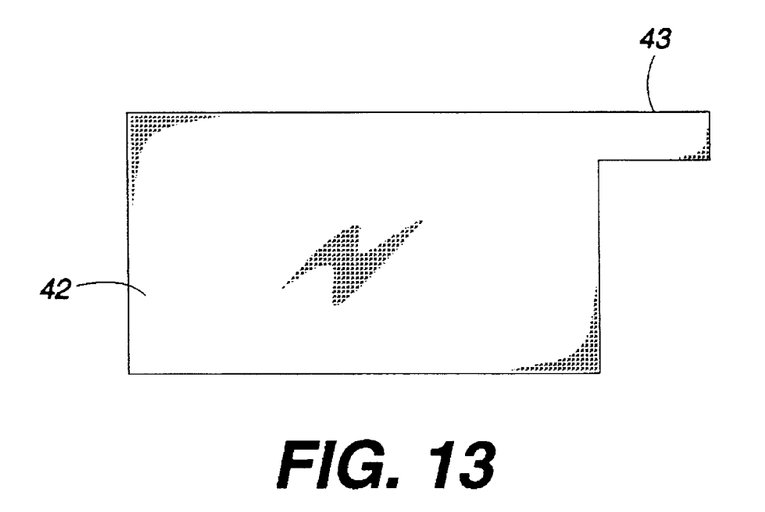
FIG. 13 is a plan view of the anode collector.
Figure 14:
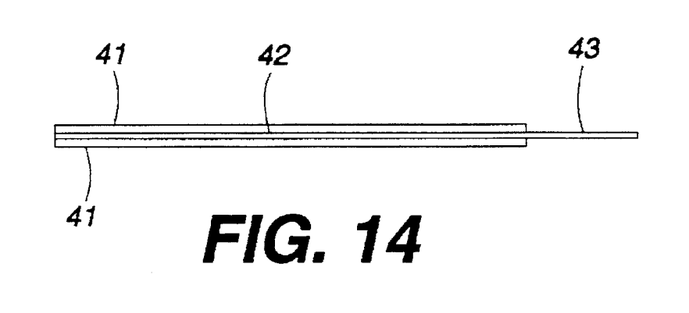
FIG. 14 is a side view of the anode assembly.
Figure 15:
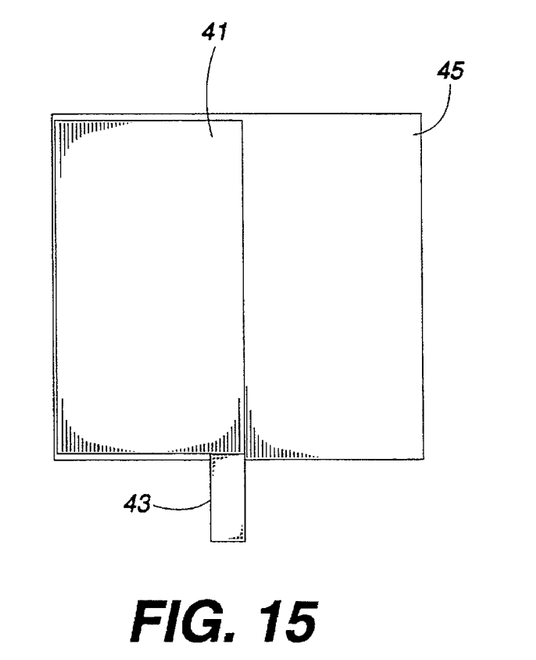
FIG. 15 is a plan view of the anode assembly positioned on a layer of fibrous web material, at the initial step of assembly of the anode bag.
Figure 16:
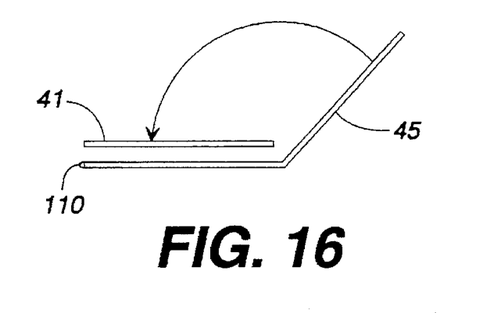
FIG. 16 is a side view showing the surrounding of the anode assembly by the layer of fibrous web material.
Figure 17:
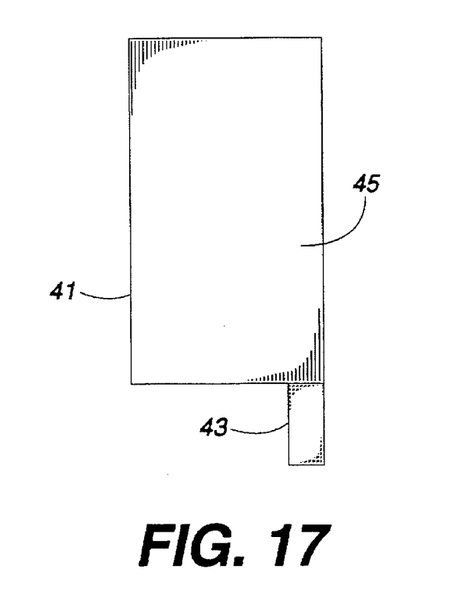
FIG. 17 is a plan view showing the anode assembly covered with the layer of fibrous web material.
Figure 18:
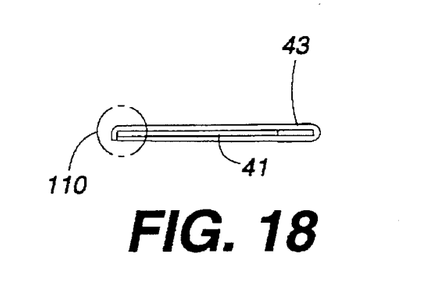
FIG. 18 is a side view showing the bonding of the layer of fibrous web material around the anode assembly.
Figure 19:
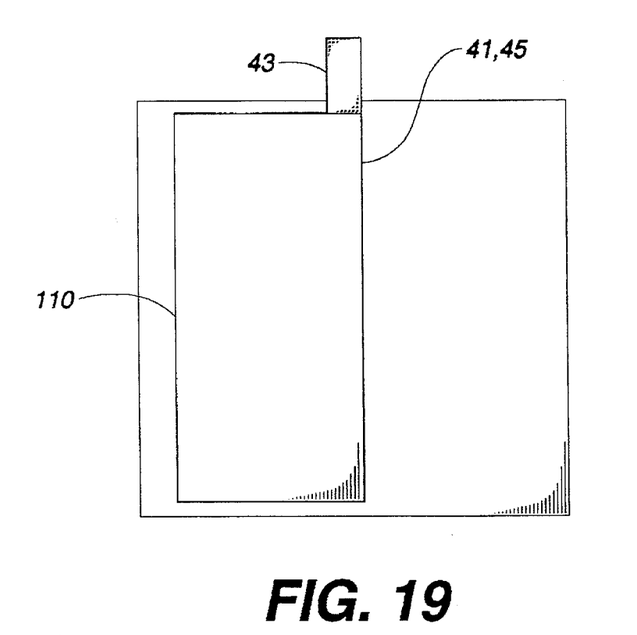
FIG. 19 is a plan view of the anode assembly with the layer of a fibrous web material, positioned on a layer of a microporous membrane.
Figure 20:
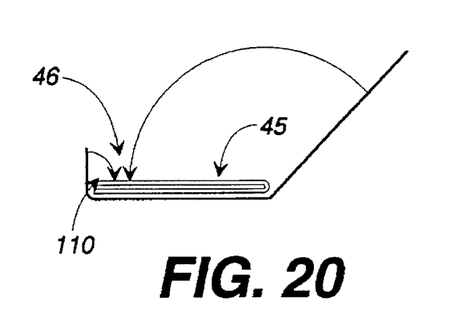
FIG. 20 is a side view showing the surrounding of anode assembly with the layer of fibrous web material by the microporous membrane.
Figure 21:
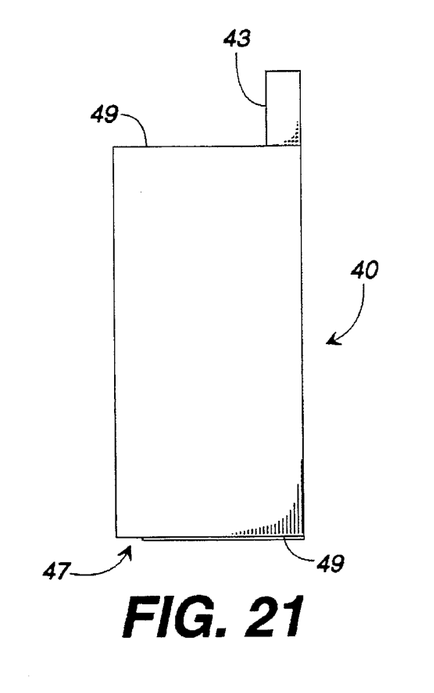
FIG. 21 is a plan view showing the completed anode bag.

As is shown in FIGS. 12–14 the anode assembly 120 includes a two layer anode 41 surrounding a current collector screen, or an anode collector screen 42. Each layer of the anode 41 is ultrasonically welded to the anode collector screen 42. The anode 41 preferably is a zinc or zinc alloy metal sheet, and may be perforated or expanded. Alternatively, the material of the anode 41 may be a paste of a type known in the art. Each layer of the anode 41 is approximately 0.02 inches thick. The anode collector screen 42 preferably comprises a screen of expanded silver of approximately 0.003 inches thickness. Other suitable materials for the anode screen 42 include lead-plated copper, silver-plated copper, and tin-plated copper. The anode collector screen 42 extends into an anode tab 43 that continues out of the casing 20 to provide a positive terminal for the cell 10. As with the cathode tabs 53, one of the side walls 23 of the casing 20 has an anode recess 48 therein to accommodate the positioning of the tab 43.

Figure 25:
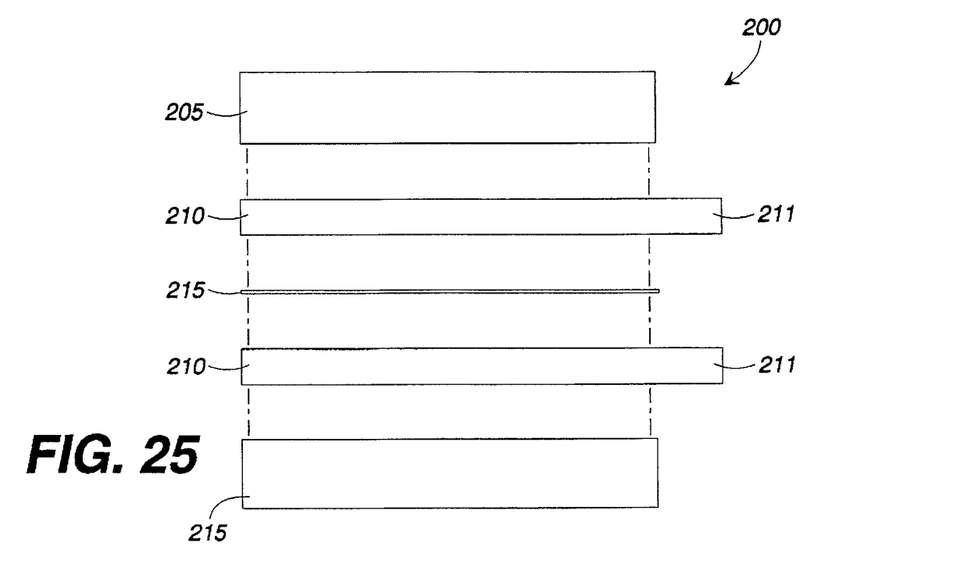
FIG. 25 is a side cross-sectional view of an alternative embodiment of the anode assembly with a separator layer.
Figure 26:
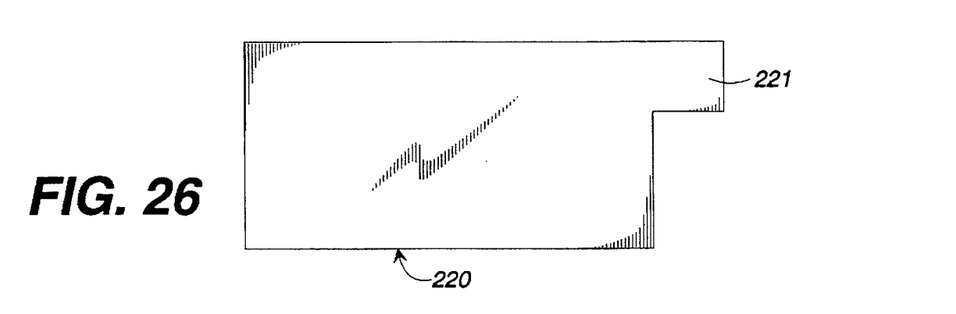
FIG. 26 is a plan view of a foil anode collector.
Figure 27:
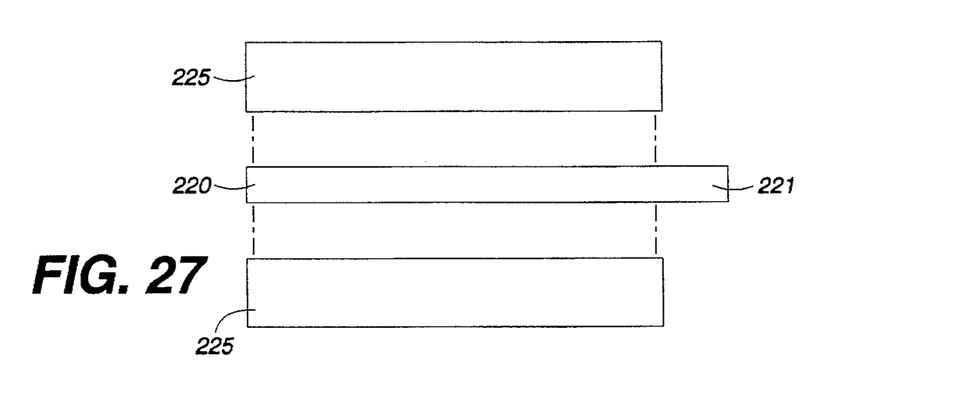
FIG. 27 is a side cross-sectional view of an alternative embodiment of the anode assembly with a foil anode collector.

As is shown in FIGS. 25–27, several alternative constructions of the anode assembly 120 are possible. For example, in FIG. 25 another type of a "split" anode assembly 200 is shown. This anode assembly 200 comprises a two layer anode 205, with one layer positioned on the top and one layer position on the bottom of a two layer anode collector screen 210. The anode collector screen 210 in turn has one layer on the top and one layer on the bottom of a layer of a separator material 215. The separator layer 215 preferably comprises a microporous membrane such as a polypropylene membrane sold under the trademark Celgard 3501. Other types of microporous membranes can be used. Other suitable materials include an ion exchange membrane sold by R.A.I. under the trademark "Zammo." The separator layer 215 inhibits movement of the anode material and, hence, inhibits slumping of the anode 41 during cycling of the cell 10.

Each of the anode collector screens 210 form anode tabs 211. The separator layer 215 is positioned between the two anode collector screens 210 and the screens 210 are ultrasonically welded together either at the tabs 211 or spot welded along the periphery of the collector screens 210. The anode layers 205 are then ultrasonically welded to the anode collector screens 210. Each layer of the anode 205 is approximately 0.02 inches thick. Each layer of the anode collector screen 210 is approximately 0.002 to 0.003 inches thick.

A further embodiment of the anode assembly 40, 200 is shown in FIGS. 26 and 27. Rather than the anode collector screens 42, 210 shown in FIGS. 13 and 25, FIG. 26 discloses a foil anode collector 220. The foil anode collector 220 preferably comprises a foil of expanded silver of approximately 0.001 inch thickness. The foil anode collector 220 extends into an anode tab 221. As is shown in FIG. 27, this foil anode collector 220 is positioned between a two layer anode 225. Each layer of the anode 225 is ultrasonically welded to the foil anode collector 220. The foil anode collector 220 also can be used in the place of the anode screen 210 with the separator layer 215. The solid metal collector 220 serves to inhibit the anode material from moving between the two layers of the anode 225.

After the anode bag 40 is in place, the side walls 23 adjacent to the respective mask walls 21, 22 of the casing 20 are heat sealed together to enclose the cell 10. One of the vents caps 30 is also sealed to the casing 20 by the hot melt method. Liquid electrolyte 90 is then poured into the aperture 31 on the opposite end of the casing 20. The electrolyte 90 is substantially absorbed by the fibrous webs 45, 71, though the microporous membranes 46, 72 do absorb some electrolyte 90. After a sufficient period of time has elapsed to permit any trapped air bubbles to escape from the interior of the cell 10, the other vent cap 30 is then sealed into place.

The electrolyte 90 may be any suitable aqueous base including a group I metal hydroxide. Examples include LiOH, NaOH, KOH, CsOH, or the like, as disclosed in U.S. Pat. No. 4,957,826 to Cheiky, the disclosure of which is incorporated herein by reference. Approximately 55 grams of electrolyte 90 are used to fill the cell 10.

In order to prevent leakage of electrolyte 90 out of the cell casing 20, it has been found to be beneficial to separate the respective cathode tabs 53. Electrolyte 90 can wick out of the cell 10 along the metal to metal contact of the cathode tabs 53. To prevent this metal to metal contact, leak tabs 56 may be incorporated into the cathode support frames 54.

Figure 23:
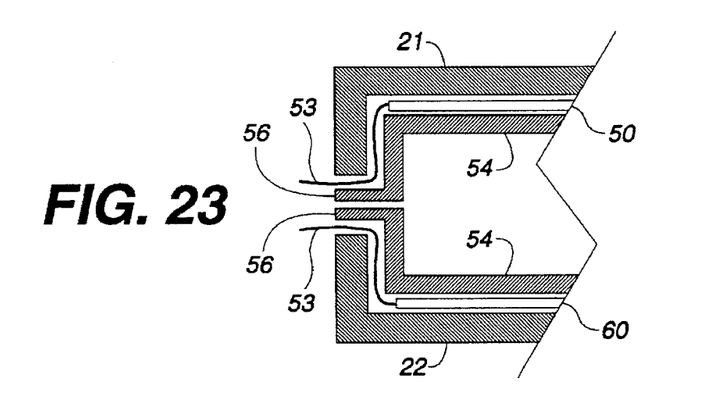
FIG. 23 is a side cross-sectional view showing the separation of the cathode tabs by the leak tabs of the cathode support frame.
Figure 24:
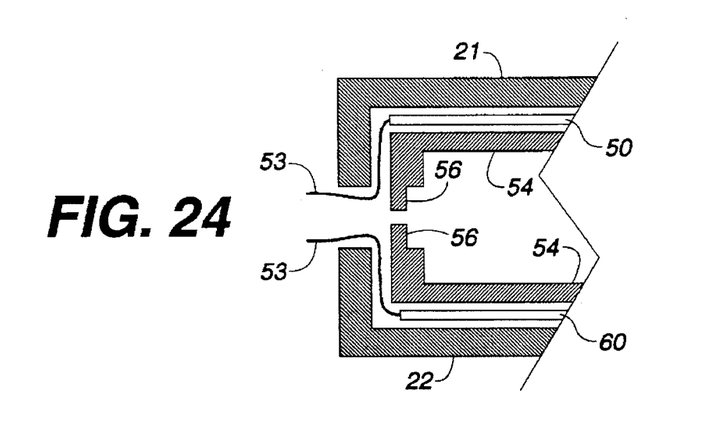
FIG. 24 is an alternative embodiment of the leak tabs of the cathode support frame.

As is shown in FIGS. 23 and 24, the cathodes 50, 60 are positioned between the respective cathode mask walls 21, 22 and the respective cathode support frames 54. By extending the support frames 54 beyond the ends of the mask walls 21, 22, one or more of these leak tabs 56 can be positioned between the respective cathode tabs 53 and thereby prevent the metal to metal contact. The leak tabs 56 can be either a horizontal or vertical extension of the cathode support structure 54 such that when the respective support frames 54 are joined, the leak tabs 56 are forced between the tabs 53. Alternatively, a similar leak tab 56 structure could be employed to separate the cathode tabs 53 and the anode tab 43 so as to allow both sets of tabs 53, 43 to exit the casing 20 on the same side of the cell 10.

During operation of the cell 10, air enters through the openings 26 in the cathode mask walls 21, 22 and penetrates the air side 51 of the cathodes 50, 60. At the cathodes 50, 60, oxygen from the ambient air begins the electrolytic reaction that results in the production of current from the cell 10. The transfer of ions between the anode 41 and the cathodes 50, 60 is accomplished through the electrolyte 90 absorbed in the separator layers 70, 80 and the separator bag 44. When the materials are wet, the ions can pass through the microporous membranes 46, 72 and the fibrous webs 45, 71.

The size, number, and shape of the openings 26 in the mask walls 21, 22 control the amount of air to which the cathodes 50, 60 are exposed. The conical shape of the openings 26 provides for full and efficient use of the cathodes 50, 60 and prolongs the useful life of the cell 10. The relatively small size of the orifices 27 of each of the conically-shaped openings 26 promotes limited carbon dioxide intake and limited water vapor loss, while the larger area of the base 29 promotes good lateral distribution of ambient air to the diaper material 100 and the surface of the cathode 50, 60. This lateral disbursement of the ambient air eliminates the need for a separate air plenum and thereby results in a reduction of the height or width of the cell 10. Further, the use of the conically shaped openings 26 in the mask walls 21, 22 provides for easier manufacturing due to the smooth transition of the plastic material.

While the ideal mask opening would have a small percentage open area with holes that would be on the "micron" level and spaced so as to present a uniform current flux to the cathodes 50, 60 while allowing little loss of water vapor, the present construction provides sufficient air intake while maintaining the humidity of the cell 10. Although the surface of the mask walls 21, 22 between the bases 29 covers an area of the absorbent diaper 100 and the cathodes 50, 60, it has been found that oxygen rapidly diffuses laterally from the openings 26 and through the cathode assembly elements of the absorbent diaper 100 and the cathodes 50, 60 themselves. The preferred range of open space of the orifices 27 of the openings 26 to the surface area of the cathodes 50, 60 is of 0.1 to 5 percent to provide this sufficient air intake. If the size of the openings 26 were smaller than this range, sufficient oxygen would not reach the cathodes 50, 60 for adequate current production and point diffusion of oxygen through the cathodes 50, 60 may occur. On the other hand, if the size of the openings 26 were greater than this range, the cathodes 50, 60 would be subject to excessive moisture transfer and possible premature failure of the cell 10.

Once operation of the cell 10 begins, the anode microporous membrane 46 maintains the zinc and zinc oxide produced at the anode 41 in intimate contact with the anode collector 42. Once dissolved in the electrolyte 90, zinc oxide tends to flow under the force of gravity throughout the cell 10. Once the zinc oxide has lost contact with the anode collector 42, however, the capacity of the cell 10 can dissipate and shorten the lifetime of the cell 10. This dispersion of zinc oxide is largely prevented by the microporous membrane wrap 46 because the zinc oxide cannot pass through the membrane 46. The zinc oxide is maintained in the current field such that the capacity of the cell 10 does not dissipate.

Further, the capacity of the cell 10 is maintained by the dual cathode 50, 60 configuration. Because there is a cathode 50, 60 on either side of the anode 41, the zinc or zinc oxide will generally remain in the current field at all times.

Similarly, the alternative embodiments of the anode assembly 120 shown in FIGS. 25–27 prevent "slumping" or the loss of zinc oxide from the top side of the anode 41, 205, 225 to the bottom side. The barrier layers 215, 220 in the "split" anode design prevent zinc oxide from falling through the current collector 42. The separator layer 215 shown in FIG. 25 mechanically stops the zinc oxide from traveling away from the top anode 205 and falling through the anode screen 210. Similarly, the use of the foil anode collector 220 shown in FIG. 27 also prevents the escape of zinc oxide away from the top anode 225. This design limits capacity loss, operating voltage loss, and any imbalance in current distribution between the two cathodes 50, 60 caused by the falling zinc oxide. The use of the two layer anode screen 210 also has the advantage of providing stronger anode tabs 211.

The anode microporous membrane 46 also prevents the growth of dendrites (not shown) on the metal anode 41. These dendrites can grow in prior art cells from the anode 41 toward the cathodes 50, 60. Any contact between the dendrites and the cathodes 50, 60 can result in a short circuit in the cell 10. The microporous membrane 46 prevents the dendrites from growing by maintaining the zinc oxide generated at the anode 41 in intimate contact with the anode 41. The zinc oxide cannot pass through the microporous membrane 46 and contact the cathodes 50, 60.

The microporous membranes 72 in the separator layers 70, 80 also aid in the prevention of dendrite growth by acting as a backup layer in case of any imperfections in the anode layer 46. Further, the slits 73 are present in the center of the microporous membranes 72 of the separator layers 70, 80 to permit the escape of gas bubbles when the cell 10 is originally filled with electrolyte 90. Gas trapped under the membranes 72 adjacent to the cathodes 50, 60 can cause nonuniformity in current density across the cathodes 50, 60 and also can cause nonutilization of areas of the anode 41. This results in capacity loss and eventual failure of the cell 10. Because the dendrite growth tends to form near the edges 55 of the anode 41 and the cathodes 50, 60, the placement of the slits 73 in the center of the membranes 72 permits gas bubbles to escape while maintaining a barrier to dendrite formation.

The microporous membranes 46, 72 of the separator bag 44 and the first and second separator layers 70, 80 also largely eliminate the self discharge of the cell 10. Oxygen may seep into the cell 10 via the vent caps 30. Because hydrogen gas is generated within the cell 10 as part of the charging reaction as well as during storage, the vent caps 30 are a necessity in an efficient cell 10. Access to the anode 41 by ambient air, however, can cause the anode 41 to discharge. This discharge is substantially eliminated by wrapping the anode 41 in the microporous membrane 46. When wet, the microporous membrane 46 is largely gas impermeable such that oxygen from the ambient air must go through a solubility step to pass through the membrane 46. The solubility step is a relatively slow process such that self discharge of the cell 10 is largely eliminated.

The use of the absorbent fibrous webs 45, 71 of the separator bag 44 and the first and second separator layers 70, 80 provides the cell 10 with orientation independence. The electrolyte 90 is substantially absorbed by the fibrous absorbent webs 45, 71 that, along with the microporous membranes 46, 72, fill substantially all of the area between the anode 41 and the cathodes 50, 60. The absorbent fibrous webs 45, 71 absorb almost all of the electrolyte 90 such that there is little, if any, free flowing electrolyte 90 in the cell casing 90. The electrolyte 90 is essentially trapped in place in the absorbent webs 45, 71 such that the cell 10 can operate in any orientation. The microporous membrane layers 46, 72 of the separator bag 44 and the first and second separator layers 70, 80 act as wicking separators between the absorbent layers 45, 71 that permit the transfer of liquids such as electrolyte 90, but are largely impermeable to gases. Trapping the electrolyte 90 in the absorbent fibrous webs 45, 71 also lessening the chances of leakage from the cell 10.

The vent caps 30 of the casing 20 provides means for venting from the cell 10 the hydrogen and other gases generated during recharge and storage. The vent caps 30 are provided with one or more gas exit holes 32 that are sufficiently small to prevent excessive carbon dioxide intake from the atmosphere and also to prevent excessive water loss from the cell 10. The vent cap 30 also has a gas collection area 35 with a gas collection or diffusion membrane 36 defined by one or more gas permeable, hydrophobic membranes 34, 37. The membranes 34, 37 maintain the humidity within the casing 20, while hydrogen and other gases generated within the cell 10 can collect in the gas collection area 35 before being vented to the atmosphere.

The present invention therefore provides a metal-air cell 10 with not only greatly increased power output, but also a more efficient means to produce that power. The use of the dual cathode 50, 60 configuration provides significant benefits to the operation of the cell 10. The cell 10 can produce double the power of a single cathode cell, i.e. up to 3 watts as compared to 1.5 watts. Further, the cell 10 has an energy density of approximately 150–230 watt-hours/kilogram as compared to the energy density of a single cathode cell of 140–190 watt-hours/kilogram. The double cathode cell 10 runs at a higher voltage than a single cathode cell at a given drain and hence has an increased energy density.

The lifetime of the cell 10 is also greatly extended by preventing self discharge of the cell, by maintaining cell capacity, and by preventing dendrite growth. Further, the use of a trapped electrolyte system, as opposed to a flooded system, provides a cell 10 that can be operated in any orientation. The novel and unique combination of these advantages results in a significant improvement in a metal-air cell design and operation.

Please note that the terms "upper" and "lower" are used herein to define a relative frame of reference for convenience and do not require any particular orientation of the cell 10 as a whole.

The foregoing relates only to the preferred embodiments of the present invention, and many changes may be made therein without departing from the scope of the invention as defined by the following claims.

We claim:

1. A dual air electrode metal-air cell, comprising:

a casing including an upper cathode mask wall, a lower cathode mask wall, and a plurality of side walls;

an anode assembly with a top side and a bottom side positioned within said casing;

said anode assembly comprising a layer of anode material positioned above, and a layer of anode material positioned below, an anode collector and means for inhibiting movement of anode material between said two anode layers, wherein said two anode layers and said anode collector are electrically connected to one another;

said anode assembly covered with separator materials on said top side and said bottom side;

an upper air cathode positioned between said upper cathode mask wall and said separator materials on said upper side of said anode assembly;

a lower air cathode positioned between said lower cathode mask wall and said separator materials on said lower side of said anode assembly;

a gas vent positioned on at least one side wall of said plurality of side walls of said casing; and a liquid electrolyte substantially trapped by said separator materials.

2. The dual air electrode metal-air cell of claim 1 wherein said cell is a zinc-air cell.

3. The dual air electrode metal-air cell of claim 1, wherein said anode collector comprises two anode current collector screens.

4. The dual air electrode metal-air cell of claim 3, wherein said means for inhibiting movement of anode material between said two anode layers comprises an anode separator layer positioned between said two anode collector screens, said anode separator layer being essentially impermeable to said anode material.

5. The dual air electrode metal-air cell of claim 4, wherein said anode separator layer comprises a microporous membrane.

6. The dual air electrode metal-air cell of claim 1, wherein said anode collector and said means for inhibiting movement of anode material between said two anode layers comprise a solid foil anode collector.

7. The dual air electrode metal-air cell of claim 1, wherein said anode collector and said means for inhibiting movement of anode material between said two anode layers comprise one or more layers of expanded silver.

8. The dual air electrode metal-air cell of claim 1 wherein said separator materials comprise one or more layers of a microporous membrane.

9. The dual air electrode metal-air cell of claim 1 wherein said separator materials comprise one or more layers of an absorbent material.

10. The dual air electrode metal-air cell of claim 1, wherein said separator materials comprise one or more layers of an absorbent fibrous web surrounding said anode assembly and one or more layers of a microporous membrane surrounding and forming a substantially sealed bag around said absorbent fibrous web and said anode assembly.

11. The dual air electrode metal-air cell of claim 1, further comprising:
an upper separator layer positioned between said upper air cathode and said separator materials on said upper side of said anode assembly; and
a lower separator layer positioned between said lower air cathode and said separator materials on said lower side of said anode assembly.

12. The dual air electrode metal-air cell of claim 1 wherein said mask walls define a plurality of conically shaped openings.

13. The dual air electrode metal-air cell of claim 1 further comprising a layer of an absorbent diaper material positioned between said upper cathode mask wall and said upper cathode and between said lower cathode mask wall and said lower cathode.

14. A dual air electrode zinc-air cell, comprising:
a casing including an upper cathode mask wall, a lower cathode mask wall, and a plurality of side walls;
a two layer zinc anode positioned within said casing;
an anode collector and means for inhibiting movement of anode material positioned between said two layers of said two layer zinc anode, wherein said two layers of said two layer zinc anode and said anode collector are electrically connected to one another;
said two layer zinc anode enclosed within an anode bag including an upper side and a lower side;
said anode bag comprising a layer of an absorbent fibrous web surrounding said zinc anode and a layer of a microporous membrane that, when wet, is gas-impermeable and liquid-permeable, surrounding said absorbent fibrous web and said zinc anode;
an upper air cathode positioned adjacent to said upper cathode mask wall;
an upper separator layer comprising a layer of an absorbent fibrous web and a layer of a microporous membrane that, when wet, is gas-impermeable and liquid-permeable, positioned between said upper cathode and said upper side of said anode bag;
a lower air cathode positioned adjacent to said lower cathode wall;
a lower separator layer comprising a layer of an absorbent fibrous web and a layer of a microporous membrane that, when wet, is gas-impermeable and liquid-permeable, positioned between said lower air cathode and said lower side of said anode bag;
a gas vent positioned on a side wall of said plurality of side walls of said casing; and
a liquid electrolyte substantially trapped by said absorbent fibrous webs and said microporous membranes.

15. The dual air electrode metal-air cell of claim 14, wherein said anode collector comprises two anode collector screens.

16. The dual air electrode metal-air cell of claim 15, wherein said means for inhibiting movement of anode material between said two layers comprises an anode separator layer positioned between said two anode collector screens, said anode separator layer being essentially impermeable to said anode material.

17. The dual air electrode metal-air cell of claim 16, wherein said anode separator layer comprises a microporous membrane.

18. The dual air electrode metal-air cell of claim 14, wherein said anode collector and said means for inhibiting movement of anode material positioned between said two layers of said two layer zinc anode comprise a foil anode collector.

19. The dual air electrode metal-air cell of claim 14, wherein said anode collector and said means for inhibiting movement of anode material positioned between said two layers of said two layer zinc anode comprise one or more layers of expanded silver.

20. A split anode for a metal-air cell, comprising:
a two layer metal anode;
a two layer anode collector positioned between said two layers of said two layer metal anode, wherein said two layers of said two layer anode collector and said two layers of said two layer metal anode are electrically connected to one another; and
a separator layer positioned between said two layers of said two layer anode collector.

21. The split anode of claim 20, wherein said metal anode layers comprise zinc.

22. The split anode of claim 20, wherein said separator layer comprises a microporous membrane.

23. The split anode of claim 20, wherein said two anode collector layers each comprise an anode collector screen.

24. The split anode of claim 20, wherein said two anode collector layers each comprise a foil anode collector.

25. The split anode of claim 20, wherein said two anode collector layers each comprise a layer of expanded silver.

26. The split anode of claim 20, wherein said two layers of said two layer metal anode are constructed of like material.

27. A metal-air cell, comprising:
an anode assembly having a top side and a bottom side, and including
a layered metal anode including an upper layer and a lower layer, and
first means positioned between said upper layer and said lower layer for collecting electrons from said upper layer and said lower layer and inhibiting movement of anode material between said upper layer and said lower layer, wherein said two layers of said layered metal anode and said first means are electrically connected to one another;
an upper air cathode positioned above said top side of said anode assembly;
a lower air cathode positioned below said bottom side of said anode assembly; and
a liquid electrolyte interposed and communicating between said upper layer and said upper air cathode, and interposed and communicating between said lower layer and said lower air cathode.

28. The metal-air cell of claim 27, wherein said two layers of said layered metal anode are constructed of like material.

29. The metal-air cell of claim 28, wherein said anode assembly is at least partially bounded by a microporous membrane.

30. The metal-air cell of claim 27, wherein said first means includes a two layer anode collector positioned between said layers of said layered metal anode, wherein said two layers of said two layer anode collector and said two layers of said layered metal anode are electrically connected to one another, and a separator layer positioned between said two layers of said two layer anode collector.

31. The metal-air cell of claim 30, wherein said anode assembly is at least partially bounded by a microporous membrane.

32. The metal-air cell of claim 31, wherein said two layers of said layered metal anode are constructed of like material.

33. The metal-air cell of claim 27, wherein said first means includes a solid metal collector positioned between said two layers of said layered metal anode to inhibit anode material from moving between said layers of said layered metal anode.

34. The metal-air cell of claim 33, wherein said anode assembly is at least partially bounded by a microporous membrane.

35. The metal-air cell of claim 34, wherein said two layers of said layered metal anode are constructed of like material.

* * * * *

UNITED STATES PATENT AND TRADEMARK OFFICE
CERTIFICATE OF CORRECTION

PATENT NO. : 5,639,568
DATED : June 17, 1997
INVENTOR(S) : Pedicini et al

It is certified that error appears in the above-identified patent and that said Letters Patent is hereby corrected as shown below:

Delete Drawing Sheet 2 of 8, that contains Fig. 7-11, and substitute therefor the Drawing Sheet 2 of 8, consisting of Fig. 5, as shown on the attached page.

Signed and Sealed this

Seventeenth Day of March, 1998

*Attest:*

*Attesting Officer*

BRUCE LEHMAN

Commissioner of Patents and Trademarks

FIG. 5